United States Patent
Dufresne De Virel et al.

(10) Patent No.: US 9,683,893 B2
(45) Date of Patent: Jun. 20, 2017

(54) SYSTEM FOR DETECTION AND IMAGING BY SPECTRAL ANALYSIS IN SEVERAL WAVELENGTH BANDS

(71) Applicant: SAGEM DEFENSE SECURITE, Boulogne-Billancourt (FR)

(72) Inventors: Francois Dufresne De Virel, Boulogne-Billancourt (FR); Marc Bousquet, Boulogne-Billancourt (FR)

(73) Assignee: SAGEM DEFENSE SECURITE, Boulogne-Billancourt (FR)

( * ) Notice: Subject to any disclaimer, the term of this patent is extended or adjusted under 35 U.S.C. 154(b) by 0 days.

(21) Appl. No.: 14/778,494

(22) PCT Filed: Mar. 19, 2014

(86) PCT No.: PCT/EP2014/055538
§ 371 (c)(1),
(2) Date: Sep. 18, 2015

(87) PCT Pub. No.: WO2014/147143
PCT Pub. Date: Sep. 25, 2014

(65) Prior Publication Data
US 2016/0327432 A1    Nov. 10, 2016

(30) Foreign Application Priority Data
Mar. 19, 2013  (FR) .................................... 13 52458

(51) Int. Cl.
*G01J 3/36* (2006.01)
*H04N 5/33* (2006.01)
(Continued)

(52) U.S. Cl.
CPC .............. *G01J 3/36* (2013.01); *F41G 3/147* (2013.01); *G01J 1/0407* (2013.01); *G01S 3/781* (2013.01); *G01S 3/784* (2013.01); *H04N 5/33* (2013.01)

(58) Field of Classification Search
CPC ............ G01J 3/36; G01J 1/0407; G01S 3/784
See application file for complete search history.

(56) References Cited

U.S. PATENT DOCUMENTS 4,238,765 A * 12/1980 Nagumo ................ H04N 9/045
                                                              348/242
5,149,970 A *  9/1992 Whitney ................ F41G 7/2253
                                                              250/226

(Continued)

FOREIGN PATENT DOCUMENTS

| JP | 2001201400 A | 7/2001 |
|---|---|---|
| JP | 2005266625   | 9/2005 |
| JP | 2006186512   | 7/2006 |

OTHER PUBLICATIONS

French Search Report and Written Opinion, dated Jan. 13, 2014, French Application No. 1352459.

*Primary Examiner* — Casey Bryant
(74) *Attorney, Agent, or Firm* — Blakely Sokoloff Taylor & Zafman LLP

(57) ABSTRACT

The invention relates to a system for detection and infrared imaging by spectral analysis in several wavelength bands comprising: —an imaging sensor comprising a plurality of elementary sensors together forming a matrix sensitive surface; —an imaging optic adapted for forming on the sensitive surface of the imaging sensor, a first image of the scene to be analyzed in a first wavelength band, and at least one second image of the scene to be analyzed in a second wavelength band, characterized in that said detection and imaging system furthermore comprises an optical device (Continued)

consisting of a fixed optical plate adapted for shifting the first image with respect to the second image in the plane of the sensitive surface, the shift between the images being along a direction defined by a row, a column or a diagonal of elementary sensors, the shift distance being equal to the spacing of the elementary sensors of the matrix sensitive surface along this direction or to a multiple of this spacing.

15 Claims, 9 Drawing Sheets

(51) Int. Cl.
  *G01J 1/04* (2006.01)
  *F41G 3/14* (2006.01)
  *G01S 3/781* (2006.01)
  *G01S 3/784* (2006.01)

(56) References Cited

U.S. PATENT DOCUMENTS

2004/0208223 A1* 10/2004 Tominaga .............. G01J 5/602
  374/120
2008/0122963 A1* 5/2008 Yoshida .............. H04N 5/3591
  348/308

\* cited by examiner

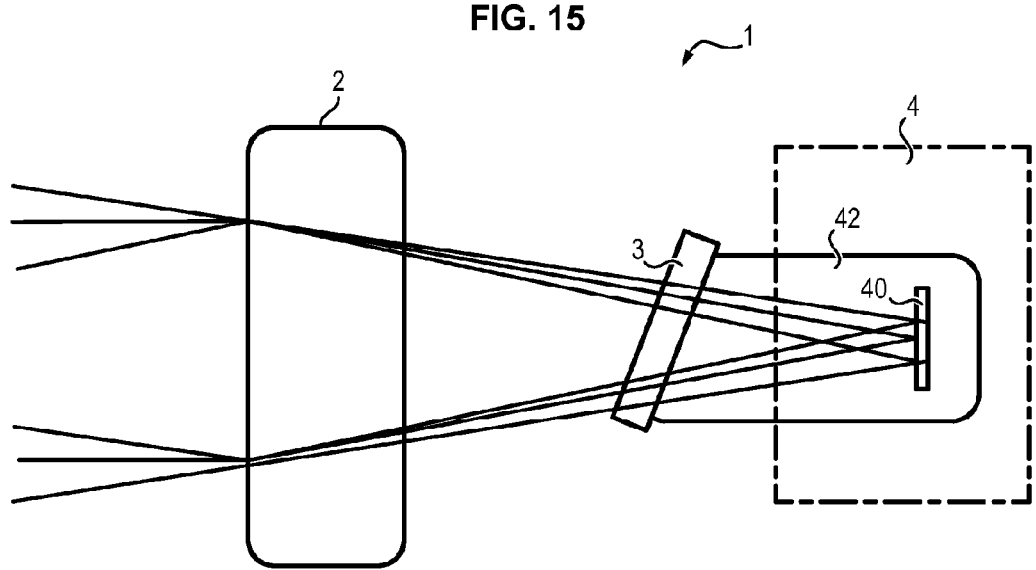
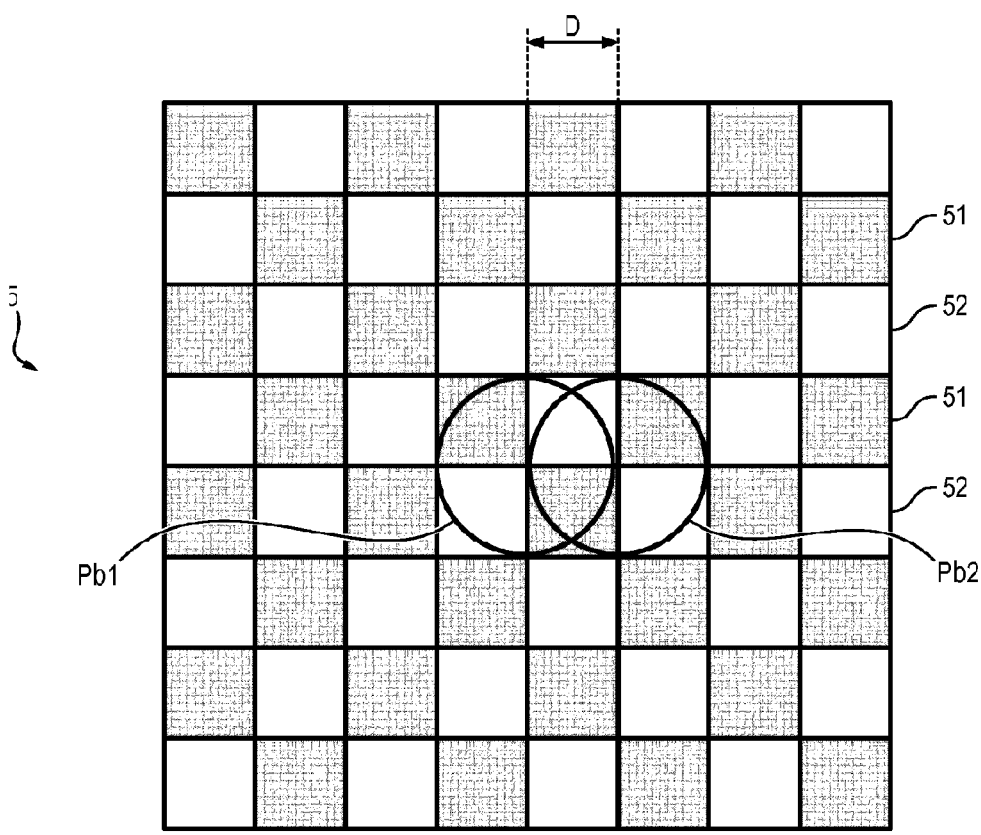

SYSTEM FOR DETECTION AND IMAGING BY SPECTRAL ANALYSIS IN SEVERAL WAVELENGTH BANDS

FIELD OF THE INVENTION

The present invention relates to the field of systems for detecting the firing of missiles or of firearms using the analysis of the generated radiations during firing and/or flight of the projectiles or missiles used. The present invention also applies to the field of monitoring a landscape or detecting objects in these landscapes, when the spectral content emitted by the objects to be detected is significant, such as for example for detecting targets illuminated by a laser beam. It also applies to any field for monitoring or detection based on the differential use of two distinct infrared spectral bands.

STATE OF THE ART

Combustion in the atmosphere is expressed by a spectrum having a certain number of distinctive features and notably between 3.5 and 4.2 micrometers and between 4.55 and 4.8 micrometers. Moreover, the different wavelengths of the emission spectrum are not subject to the same absorption in the atmosphere. The ratio between the intensity of radiations with wavelengths comprised between 3.5 and 4.2 micrometers and the intensity of radiations with wavelengths comprised between 4.55 and 4.8 micrometers thus strongly varies depending on the distance between the combustion point and the detector.

This property is advantageously used for detecting firings of firearms, which produce emissions for which the ratio between the intensities in both spectral bands is characteristic, the starting and the flight of propelled missiles corresponding to combustion approaching the detection system, relatively to objects which either would not correspond to combustions (reflections of the sun on water surfaces or on the clouds), or which would not approach the detection system. Application EP 1 718 067 A1 for example proposes a method for detecting firings using these properties.

However, such a method does not allow efficient detection of firings of lightweight weapons. Indeed, in order to detect firings of lightweight weapons, it is necessary to be able to detect in real time the radiations in both of these spectral bands simultaneously and with very good spatial resolution and with very large sensitivity.

Of course, it is possible to use two spectral channels partly or completely different but such systems are expensive and cumbersome. Further, the performance of systems operating on this principle is for a large portion based on the stability, depending on different operating conditions, of the signal levels in the relevant spectral bands and on their respective ratios. It is therefore necessary to use systems providing very few differences between the spectral channels therefore to search for a maximum of common elements.

The detection of firings of light-weight weapons, characterized by a low intensity and a small spatial dimension, requires the use of systems for which the optical definition is adapted to these small spatial sizes, with optical resolution—an optical spot (also called a point spread function (PSF))—substantially equal to the size of a detector. Further, the sought performances often impose the use of a cooled sensor, so as to obtain great detection sensitivity.

Document U.S. Pat. No. 7,592,593_B2, for example proposes an imaging sensor for which the elementary sensors are spatially distributed between two types, each of the latter being sensitive to one of the two relevant spectral bands. However, this solution imposes the making of a sensor integrating two different technologies. In addition to the difficulties for making this type of sensor, the variations in performances between both types of elementary sensors are not very compatible with the targeted uniformity goals for good performance of these systems. This solution also suffers from the fact that both spectral components are measured in different points of the object. When this is an object for which the image dimension on the sensor is less than the size of the elementary sensor or than that of the optical spot, for example a flame of a firearm as seen from a great distance, one of the two channels will not see this object and very troublesome masking phenomena are thereby induced. When the image dimension of the object is greater than the size of the elementary sensor or than that of the optical spot, the fact of not measuring both spectral components at the same location on the object or on the scene distorts the comparison and may cause lack of detection. In order to avoid all these problems and avoid any masking, it is necessary, by adaptation of the optical spot to cover both types of elementary sensors for a targeted object point. This therefore induces, for the detection system, a loss of optical resolution of the order of two relatively to the size of the elementary sensors and imposes having optics for which the optical resolution—the optical spot—is optimized so as to be substantially equal to the size of two elementary sensors.

If the intention is to use a sensor of a single type, it is possible to equip the latter with a matrix of filters of the Bayer type or other in order to obtain two ranges of sensitivity for the elementary detectors as proposed by U.S. Pat. No. 8,014,062_B2. This solution has the drawback, as described earlier, of not exactly seeing, at the sensor, the same area of the scene between both sensitivity ranges. This is prohibitive in the case of small objects to be detected, objects for which the apparent size on the plane of the sensor is of the order of or less than the size of an elementary sensor. Of course, as earlier, it is possible to degrade the resolution of the imaging optics—its optical spot—for covering two adjacent detectors, but this goes against the need of resolution required for detecting this type of target.

Another solution is the use of sensors for which the elementary sensors consist of a stack of two types of sensors, and for example those described in documents EP1915781_B1, U.S. Pat. No. 8,238,026_B1, U.S. Pat. No. 7,655,911_B2, U.S. Pat. No. 6,236,508_B1, but these solutions imply the use of complicated optics, since it is necessary to have a distinct image plane for each band of wavelengths, and of a complex sensor to be made and therefore expensive upon use. This type of solution cannot therefore be suitable for solving the posed problem which aims at simplicity of the detection system, its homogeneity between both channels, and the use of a standard sensor of reduced cost.

It is also possible to envision systems where exploration of the spectral bands is ensured by the use of a movable element and notably those described in documents U.S. Pat. No. 7,760,227_B2 or EP1564987_A1, but these systems cannot be suitable, since the analysis of both spectral bands is not simultaneous and therefore does not allow a valid comparison of the signal from targets emitting very briefly, which have to be observed in real time, simultaneously.

Solutions with an optical prism, as the one described in document EP2221655_A1, may also be considered but, in addition to complex optics or more, these solutions impose placement of the prism in a pupil space or equivalent, a space where the propagation of the rays is accomplished as "parallel rays" according to the accepted expression. This goes against the compactness of the system, because of the required creation of this actual pupil space, is also of a high cost because of the complexity for making the optics and therefore is not suitable for these reasons.

DISCUSSION OF THE INVENTION

The object of the invention is to propose a simple and compact detection system in several different spectral bands, simultaneously, and with very good spatial resolution and good uniformity between channels.

For this purpose, the invention proposes an infrared imaging and detection system by spectral analysis in several bands of wavelengths including:
   an imaging sensor including a plurality of elementary sensors forming together a sensitive matrix surface;
   an imaging optics adapted in order to form on the sensitive surface of the imaging sensor, a first image of the scene to be analyzed in a first band of wavelengths, and at least one second image of the scene to be analyzed in a second band of wavelengths,
characterized in that said imaging and detection system further includes an optical device consisting of a fixed optical plate and adapted for shifting the first image relatively to the second image in the plane of the sensitive surface, the shift between the images being along a direction defined by a row, a column or a diagonal of elementary sensors, the shift distance being equal to the spacing of the elementary sensors of the matrix sensitive surface along this direction or to a multiple of this spacing.

The fixed optical plate gives the possibility of obtaining a shift of only a few pixels. This small shift of a few pixels is advantageous since both obtained images are seen through quasi-identical areas of the imaging sensor, which reduces the deviations due to non-uniformities of the imaging sensor.

Further, the fact of being produced for a quasi-identical field by the imaging system reduces the deviations which may be induced by optical aberrations of the imaging system and their variations in the case of operating in a very different field between both images (case when the shift between both images is significant, i.e. with a size comparable to the size of the produced images).

Because of the use of a single optical plate, the deviation of both images is essentially obtained by selecting the material, the thickness and the tilt of the optical plate. The device does not require very accurate adjustments, considering the accuracies which may be obtained during manufacturing for the thickness and the tilt of the optical plate which allows simple manufacturing without any particular adjustment.

Moreover, the optical plate is adapted for operating with convergent rays and not with collimated rays. This operation with convergent rays allows placement of the device in spaces available inside the imaging and detection system without increasing too much the volume of the latter. In particular, said device may be placed between the last lens of the imaging optics and the imaging sensor. In the particular case when the latter is cooled and is placed in a vacuum chamber, said device may be used as a window for this vacuum chamber.

The invention is advantageously completed with the following features, taken individually or in any of their technically possible combinations:

the imaging optics is an optical focusing system, the fixed optical plate being positioned between the imaging optics and the imaging sensor;
the fixed optical device is not prismatic;
the fixed optical device is an optical plate with plane and parallel faces made in a chromatic material, said plate being fixed and tilted relatively to the plane of the sensitive surface of the imaging sensor;
the tilt angle of said plate, the thickness of the latter and its material are adapted so that the shift distance is equal to the spacing of the elementary sensors of the sensitive matrix surface, along the shift direction or to a multiple of this spacing;
the shift distance is equal to one, two or three times the distance between two elementary sensors of the matrix sensitive surface along this direction;
the optical chromatic material of the plate, has a chromatic dispersion coefficient of more than 0.002 and preferably than 0.005;
the plate is in a material which is selected from the following materials:
sapphire, calcium fluoride, barium fluoride, sodium fluoride, magnesium fluoride or magnesium oxide and silica;
the imaging and detection system includes a band pass filter adapted for optimizing the ratio of the intensities of the radiations in the first and in the second band of wavelengths;
the imaging optics is adapted so that its optical resolution—its optical spot or PSF—corresponding to the image by the imaging optics of a point like source on the sensitive surface of the imaging sensor—i.e. of dimensions substantially equal to those of an elementary sensor of the sensitive matrix surface;
the imaging and detection system includes a spatially selective band pass filter consisting of an alternation of first elementary filters letting through wavelengths comprised in the first band of wavelengths and of second elementary filters letting through the wavelengths comprised in the second band of wavelengths and positioned on or in the vicinity of the sensitive surface of the imaging sensor;
the first elementary filters and the second elementary filters of the spatially selective band pass filter are positioned according to a checkerboard matrix distribution and have a width equal to the spacing, in the shift direction, of the elementary sensors of the sensitive matrix surface;
the first elementary filters and the second elementary filters are positioned in bands perpendicular to the shift direction and have a width equal to the spacing, in the shift direction, of the elementary sensors of the sensitive matrix surface;
in the three previous configurations, the imaging optics is adapted so that its optical resolution—its optical spot or PSF—corresponding to the image of a point-like source on the sensitive surface of the imaging sensor—is of a dimension substantially equal to twice the spacing, in the shift direction, of the elementary sensors of the sensitive matrix surface;
in these three same configurations, the imaging optics is adapted so that its optical resolution—its optical spot or PSF—corresponding to the image of a point-like source on the sensitive surface of the imaging sensor—is of a dimension substantially equal to the spacing, in the direction perpendicular to that of the shift, of the elementary sensors of the sensitive matrix surface;

the imaging sensor and the fixed optical device are placed in a cryogenic chamber;
the plate forms a window of a cryogenic chamber containing the imaging sensor;
both spectral bands are selected from the following spectral bands:
  infrared bands IIa or IIb;
  infrared band I;
  one or two infrared laser bands;
  a near infrared band.

DESCRIPTION OF THE FIGURES

Other goals, features and advantages will emerge from the detailed description which follows with reference to the drawings given as an illustration and not as a limitation wherein:

FIGS. 2, 14 and 15 schematically illustrate three exemplary devices according to the invention;

FIGS. 8, 9, 11, 13, 16, 17 and 18 illustrate the images of an element of a scene to be analyzed in two bands of wavelengths on a sensitive surface of an imaging sensor according to the invention;

FIGS. 16, 17 and 18 illustrate spatially selective band-pass filters according to the invention.

For reasons of simplification and clarity of the diagrams, only the axis of propagation of the beams corresponding to each spectral band and to a point-like intended target, at infinity, the image of which is focused on the sensitive surface of the sensor, have been illustrated in FIGS. 3, 6, 7, 10 and 12.

Figure 10:
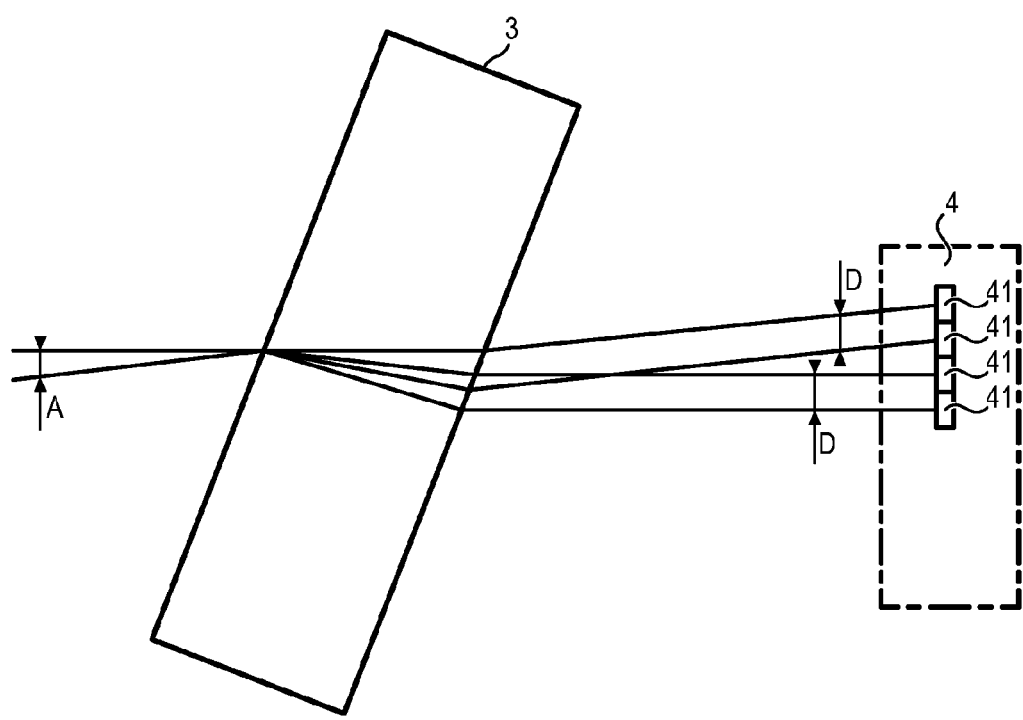

In FIG. 10, the envelopes of the beams of rays are the ones which are illustrated.

Figure 2:
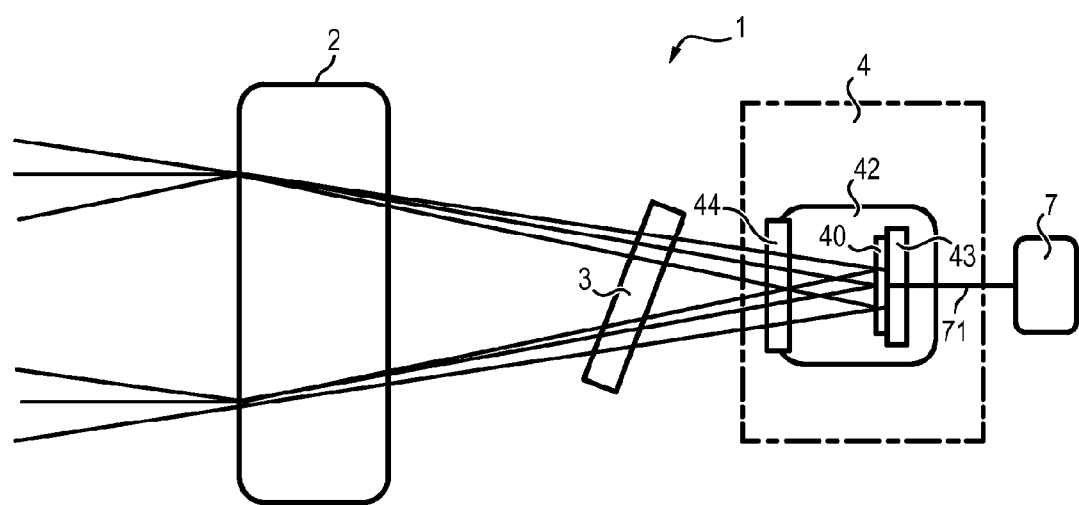
Figure 14:
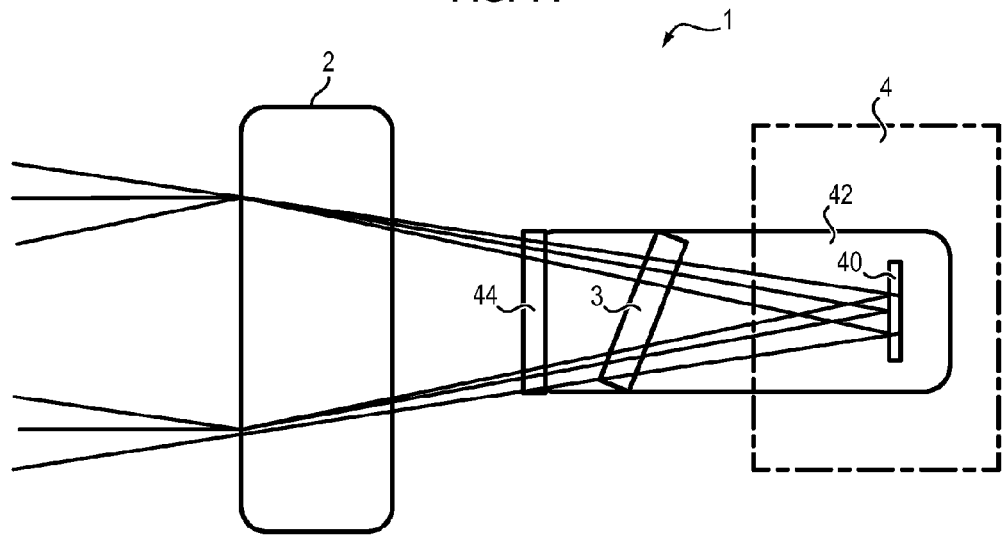

In FIGS. 2, 14 and 15, the illustration of the optical beams is made in a simplified way only as an illustration of the invention and of its embodiments.

DETAILED DESCRIPTION OF ONE OR SEVERAL EMBODIMENTS

Figure 1:
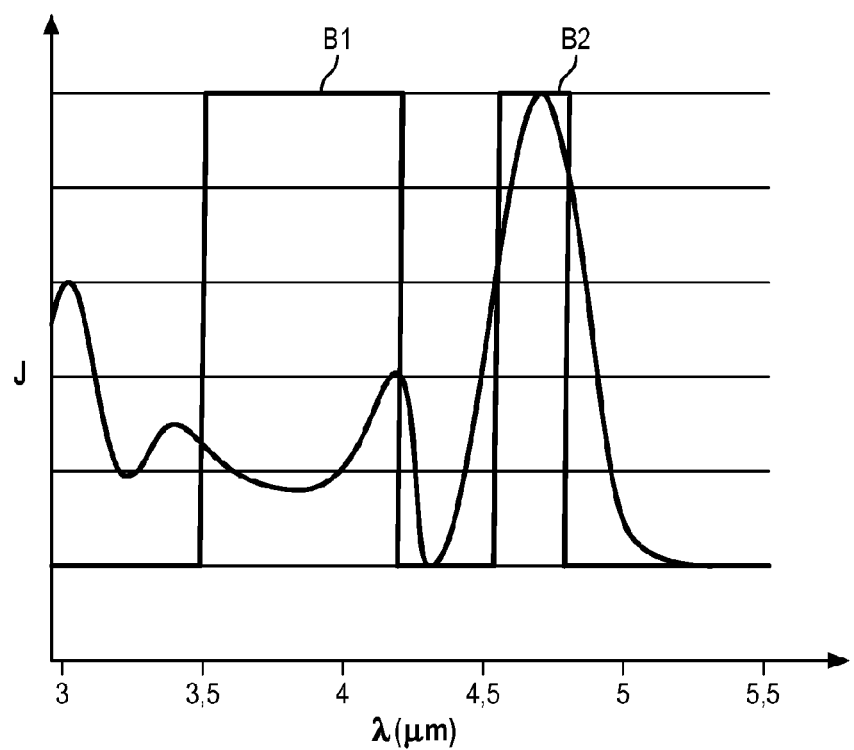
FIG. 1 represents the emission spectrum of a combustion related to firing.

With reference to FIG. 1, the emission spectrum of a combustion related to firing of a firearm has features of intensity J in a first band of wavelengths B1 corresponding to wavelengths comprised between 3.5 and 4.2 micrometers and centered on 3850 nm (IR spectral band IIa) and other intensity features in a second band of wavelengths B2 corresponding to wavelengths comprised between 4.55 and 4.8 micrometers and centered on 4675 nm (IR band IIb), corresponding to the bands delimited as square waves in FIG. 1.

With reference to FIG. 2, an imaging and detection system 1 according to the invention includes an imaging sensor 4, a processing block 7 adapted for analyzing the data transmitted by the imaging sensor 4 via a connecting device 71, imaging optics 2 and a fixed optical device 3 and positioned between the imaging optics 2 and the imaging sensor 4. The optical device 3 consists of a single fixed optical plate with planar and parallel faces.

Figure 3:
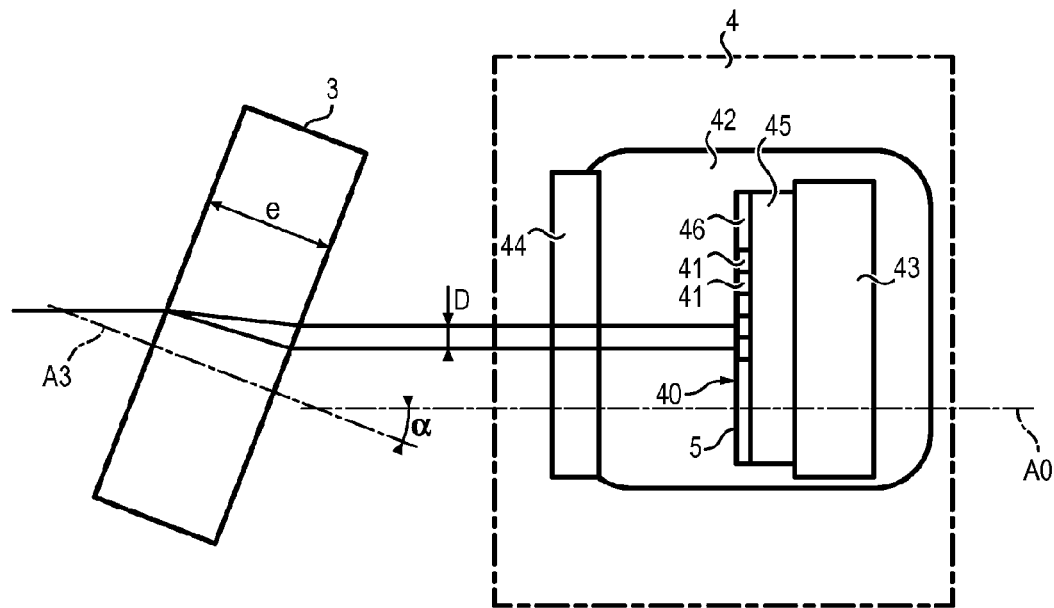
FIG. 3 schematically illustrates a layout of an imaging sensor and of a plate with planar and parallel faces according to the invention.

With reference to FIG. 3, the axis A3 perpendicular to the plane of the plate with a parallel face 3 forms a non-zero tilt angle α with the optical axis AO of the imaging sensor 4. The imaging sensor 4 includes a plurality of elementary sensors 41 forming a detection matrix 46 having a matrix sensitive surface 40 perpendicular to its optical axis AO. The sensor 4 further includes a power supply and read out device 45 for the elementary sensors 41. The imaging sensor 4 is typically an IR-CCD, IR-CID or IR-CMOS matrix sensor. The sampling frequency of the imaging sensor 4 is adapted to the detection of radiating events such as firings. The imaging sensor 4 further includes a cooling system 43 positioned behind the sensitive surface 40 and is surrounded by a cryogenic chamber 42 having a window 44 adapted for letting through the radiations in both bands of wavelengths B1 and B2. The imaging sensor 4 is sensitive to radiations belonging to both bands of wavelengths B1 and B2.

Figure 4:
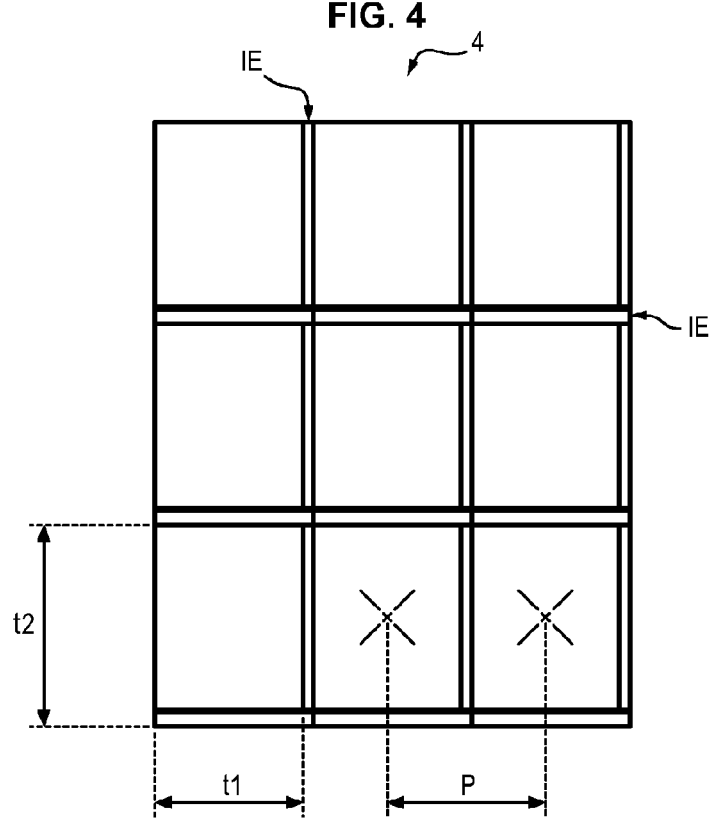
FIG. 4 schematically illustrates the matrix sensitive surface and the layout of the elementary sensors.

The imaging optics 2 is an optical focusing system adapted for giving a real image of the scene to be analyzed on the sensitive surface 40 of the imaging sensor 4. The imaging optics 2 for its optimization takes into account the presence of the plate 3 on the optical path of the rays. Advantageously, these optics will have an optical resolution, often defined by its optical spot (point spread function or PSF) and corresponding to the image of a point-like source on the sensitive surface 40 of the imaging sensor 4, substantially equal to the size of an elementary sensor t1 and t2 of the matrix sensitive surface used or further to the spacing p of the elementary sensors of the matrix sensitive surface (both of these sizes being very close to each other, the optimization of the matrix sensors being accomplished for minimizing the intermediate space between elementary sensors). With reference to FIG. 4, by size of the elementary sensors 41, is meant the dimension, in the relevant direction, of the active surface of these said sensors, and by spacing, the distance between the centre of two consecutive elementary sensors 41 in the same direction and the intermediate space IE is the non-active area of the sensitive matrix surface, located between neighboring elementary sensors. For optimization of the imaging and detection system 1, the size of the elementary sensors 41 for optimizing the imaging optics 2 and the spacing of the elementary sensors of the matrix sensitive surface in the relevant direction for selection of the shift D along this same direction will be taken into account. The material used for the detection matrix may for example be InSb, HgCdTe, materials adapted to a use in both of these spectral bands.

A chromatic material is characterized by its refractive index and the chromatic dispersion of the latter versus wavelength. When a beam passes, with non-zero incidence, from a medium having a first refractive index to a medium having a second refractive index, the beam is deviated according to Snell-Descartes laws. This deviation is produced in a different way between two different wavelengths, since the refractive index is different.

The optical plate with planar and parallel faces 3 is made in a chromatic material having a first average refractive index $n(\lambda1)$ for wavelengths included in a first band of wavelengths B1 corresponding to radiations centered around a first wavelength $\lambda1$ and a second average refractive index $n(\lambda2)$ for wavelengths included in a second band of wavelengths B2 corresponding to radiations centered around a second wavelength $\lambda2$.

With reference to FIGS. 2, 5, 14 and 15, the fixed optical plate is positioned between the imaging optics 2 and the imaging sensor 4. The optical plate is adapted so as to operate with convergent rays and not with collimated rays. This operation with convergent rays gives the possibility of placing the device in spaces available inside the imaging and detection system without increasing too much the volume of the latter. In particular, said device may be placed between the last lens of the imaging optics 2 and the imaging sensor 4. In the particular case when the latter is cooled and is placed in a vacuum chamber, said device may be used as a window for this vacuum chamber.

Figure 5:
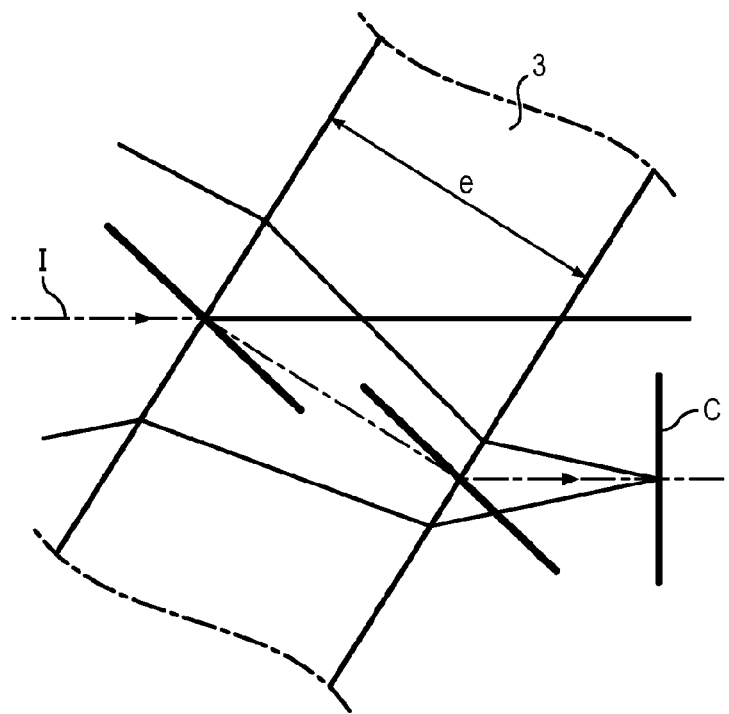
FIG. 5 schematically illustrates the optical path of a beam in a plate with planar and parallel faces and focused on the sensitive surface according to the invention.
Figure 6:
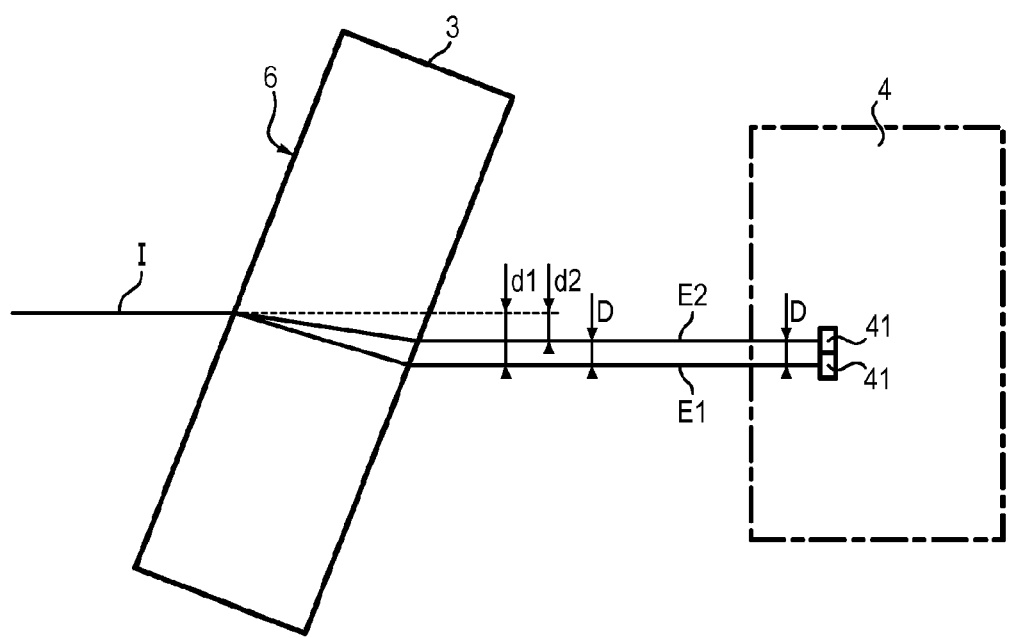
FIGS. 6, 7, 10 and 12 schematically illustrate the optical paths of the beams, symbolized by their axes of propagation, in various examples of devices according to the invention.
Figure 7:
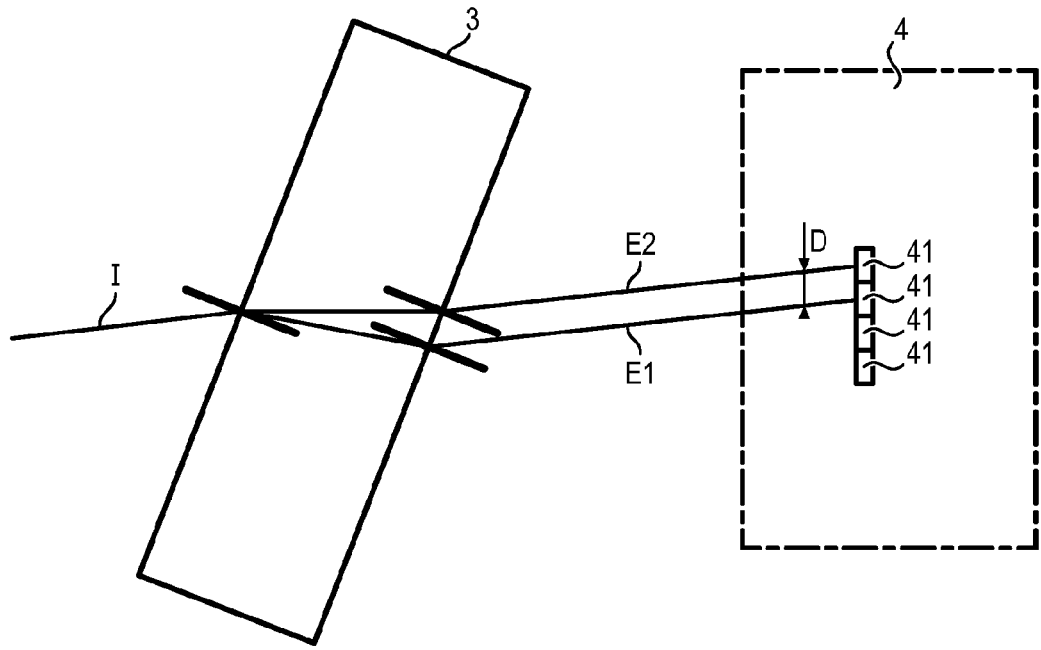

With reference to FIGS. 5, 6 and 7, an incident beam I having a spectrum notably containing the first B1 and the second B2 band of wavelengths is incident on the plate with planar and parallel faces 3. The optical plate 3 is adapted so as to transmit the radiations in both frequency bands. The components of the incident beam I belonging to the first band of wavelengths B1 are deviated by a first distance d1 while the components of the incident beam I belonging to the second band of wavelengths B2 are deviated by a second distance d2. One therefore has at the outlet of the plate with parallel faces, two emerging beams E1 and E2 with wavelengths comprised in the first B1 and in the second B2 band of wavelengths, respectively.

FIG. 5 represents the beam from a targeted point-like object crossing "with convergent rays" the plate 3 and being focused on the sensitive surface into an image C, while therefore be properly positioned during the manufacturing of the imaging and detection system without any particular adjustment.

Unlike a prism, the optical plate with planar and parallel faces 3 does not introduce any angular deviation but only a transverse shift D which corresponds to the difference between the first distance d1 and the second distance d2. The axis of propagation of the emerging beams E1 and E2 are therefore parallel to the axis of propagation of the incident beam I.

The first d1 and second d2 distances depend on the thickness e of the plate with planar and parallel faces 3, on the tilt angle α of the plate with planar and parallel faces 3 and on characteristics of the material in which is made the plate 3.

The tables below give the results obtained for a few configurations and materials, given as an illustration and not as a limitation for a spacing p between two elementary sensors 41 of 10 μm, the spacing p between two elementary sensors 41 being defined as the distance between the centers of two adjacent elementary sensors along the relevant shift in direction. Other dimensions may of course be contemplated (12.5 μm, 15 μm) for which a similar calculation may be carried out.

The first table gives the results obtained for a shift D corresponding to the spacing p between two elementary sensors 41.

| Material | Sapphire | CaF$_2$ | MgO | BaF$_2$ | NaF$_2$ | MgF$_2$ |
|---|---|---|---|---|---|---|
| Thickness e in mm | 3.92 | 13 | 4.55 | 11.4 | 7.75 | 5.8 |
| Angle α° | 10 | 10 | 10 | 15 | 15 | 15 |
| Angle α in rad. | 0.175 | 0.175 | 0.175 | 0.262 | 0.262 | 0.262 |
| λ2 nm | 4675 | 4675 | 4675 | 4675 | 4675 | 4675 |
| λ1 nm | 3850 | 3850 | 3850 | 3850 | 3850 | 3850 |
| n (λ2) | 1.641 | 1.403 | 1.637 | 1.450 | 1.301 | 1.339 |
| n (λ1) | 1.681 | 1.411 | 1.671 | 1.457 | 1.309 | 1.351 |
| Shift D in μm | 10.019 | 10.061 | 10.009 | 10.092 | 10.058 | 10.085 |

FIGS. 6 and 7 only illustrate the axes of propagation of the beams from a targeted object. FIG. 6 illustrates the axis of propagation of a beam from a targeted object placed on the targeting axis while FIG. 7 illustrates the axis of propagation of a beam from a targeted object placed in the field.

By operating the device with convergent rays, it is possible to obtain a shift of only a few pixels, which could not be obtained if the device was placed with collimated rays. This small shift of a few pixels is advantageous since both obtained images are seen by quasi-identical areas of the imaging sensor 4, which reduces the deviations due to non-uniformities of the imaging sensor 4. Further the fact of being produced for a quasi-identical field by the imaging system reduces the deviations which may be induced by the optical aberrations of the imaging system and their variations in the case of operating in a very different field between both images (case when the shift between both images is significant, i.e. with a size comparable with the size of the produced images).

Because of the use of a single optical plate 3, the shift of both images is essentially obtained by the selection of the material, of the thickness and of the tilt of the plate 3. The device does not require very accurate adjustments, considering the accuracies which may be obtained during manufacturing for the thickness and the tilt of the plate 3 and may The second table gives the results obtained for a shift D corresponding to 1.4 times the spacing p between two elementary sensors 41 (diagonal shift relatively to the rows of the elementary sensors).

| Material | Sapphire | Sapphire | MgO | MgO | MgF$_2$ |
|---|---|---|---|---|---|
| Thickness e in mm | 5.5 | 3.62 | 6.4 | 4.2 | 8.1 |
| Angle α ° | 10 | 15 | 10 | 15 | 15 |
| Angle α in rad. | 0.175 | 0.262 | 0.175 | 0.262 | 0.262 |
| λ2 nm | 4675 | 4675 | 4675 | 4675 | 4675 |
| λ1 nm | 3850 | 3850 | 3850 | 3850 | 3850 |
| n(λ2) | 1.641 | 1.641 | 1.6373 | 1.6373 | 1.339 |
| n(λ1) | 1.681 | 1.681 | 1.6714 | 1.6714 | 1.351 |
| Shift D in μm | 14.057 | 14.059 | 14.078 | 14.039 | 14.085 |

The third table gives the results obtained for a shift D corresponding to three times the spacing p between two elementary sensors 41.

| | Sapphire | Sapphire | MgO | MgO | MgF$_2$ |
|---|---|---|---|---|---|
| Thickness | 11.75 | 7.73 | 13.65 | 9 | 17.3 |

-continued

|  | Sapphire | Sapphire | MgO | MgO | MgF$_2$ |
|---|---|---|---|---|---|
| e in mm |  |  |  |  |  |
| Angle α ° | 10 | 15 | 10 | 15 | 15 |
| Angle α in rad. | 0.175 | 0.262 | 0.175 | 0.175 | 0.262 |
| λ2 nm | 4675 | 4675 | 4675 | 4675 | 4675 |
| λ1 nm | 3850 | 3850 | 3850 | 3850 | 3850 |
| N(λ2) | 1.641 | 1.641 | 1.637 | 1.637 | 1.339 |
| N(λ1) | 1.681 | 1.681 | 1.671 | 1.671 | 1.351 |
| Shift D in μm | 30.031 | 30.022 | 30.026 | 30.084 | 30.082 |

It is necessary to provide a relatively thick optical plate 3 for obtaining the desired displacement D, without however introducing a too large angle α which would be a penalty as regards congestion or would induce too many optical aberrations. All the optical materials transparent in the band 3-5 μm cannot be suitable, in particular those for which the refractive index is high like germanium, silicon, ZnSe or ZnS, since these materials are not very chromatic and require the use of too thick plate thicknesses, for the relevant spectral bands, which would lead to expensive, cumbersome solutions with great weight.

A chromatic material may be characterized by a chromatic dispersion coefficient in both of the relevant bands of wavelengths, defined as the ratio between the difference of the average indices for both spectral bands and their average value:

$$Coef_{dispersion} = 2 \cdot \frac{n(\lambda 1) - n(\lambda 2)}{n(\lambda 1) + n(\lambda 2)}$$

With n(λi) being the refractive index of the material for the average wavelength λi of the relevant spectral band i.

Materials are preferred which have high chromatic dispersion coefficients. In order to obtain plates with a reasonable thickness (typically less than 10 mm), materials should be selected, having a chromatic dispersion coefficient of more than 0.002 and preferably of more than 0.005. This corresponds, according to the materials customarily used and for the discussed case, to materials with a low refractive index (less than n=2).

The material of the optical plate 3 is transparent in the spectral bands B1 and B2 and the chromatic dispersion coefficient for two bands of wavelengths B1 and B2 of the material are compatible with the making of a plate with a thickness adapted to the relevant environments for the system or the sensor.

Therefore, a plate 3 is preferentially selected in a material selected from the following materials: sapphire, calcium fluoride, barium fluoride, sodium fluoride, magnesium fluoride, magnesium oxide or silica.

The imaging sensor 4 for example has a spacing between two elementary sensors 41 of 10 μm and a number of elementary sensors of 1,024, i.e. a useful width of the imaging sensor 4 of about 10 mm. The thickness of the plate is typically 4 mm and the tilt angle α of the plate is 10°. The plate 3 has a width adapted to its thickness e in order to guarantee its solidity and its resistance to the environments intended for the detection system.

The detection system 1 produces on the sensitive surface 40 of the imaging sensor 4, two images Pb1 and Pb2 corresponding to two bands of wavelengths B1 and B2 and shifted relatively to the other of an elementary sensor 41.

The thickness of the optical plate 3, the tilt of the latter and its material are adapted so that the shift distance is equal to one, two or three times the distance between two elementary sensors of the matrix sensitive surface along the shift direction.

Figure 8:
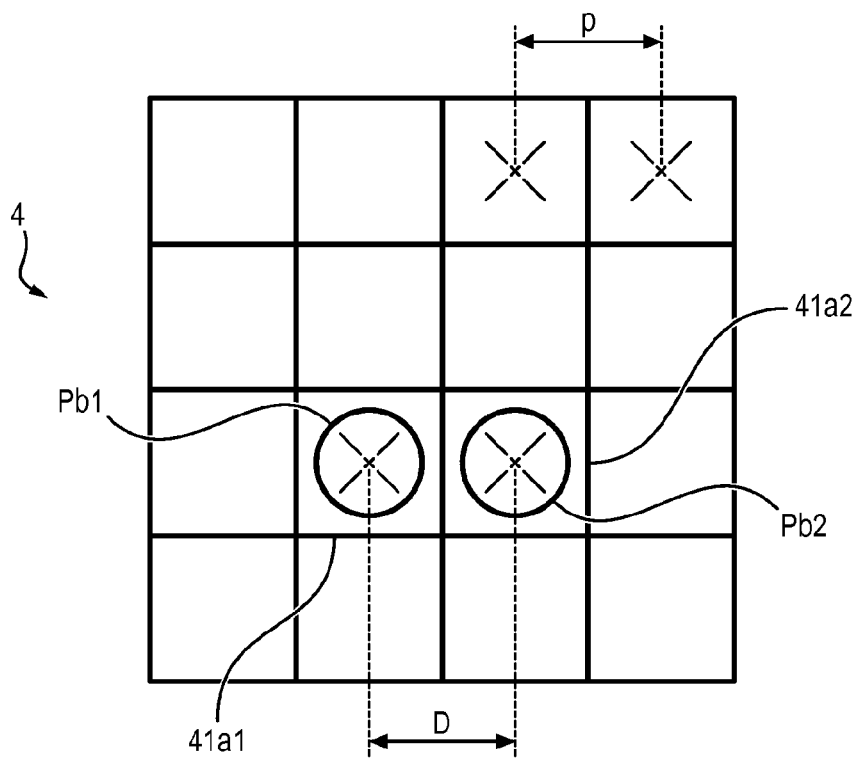

According to a first embodiment, and with reference to FIG. 8, the imaging optics 2 is adapted for forming on the sensitive surface 40 of the imaging sensor 4, a first image Pb1 of the scene to be analyzed in a first band of wavelengths B1, and a second image Pb2 of the scene to be analyzed in a second band of wavelengths B1. The plate 3 is adapted so that the first image Pb1 is shifted in the plane of the sensitive surface 40 of the imaging sensor 4, by a distance D equal to the spacing p in the direction of a row or of a column of elementary sensors 41, with respect to the second image Pb2, the spacing p of the elementary sensors being defined as the distance between the centers of two adjacent elementary sensors.

Figure 9:
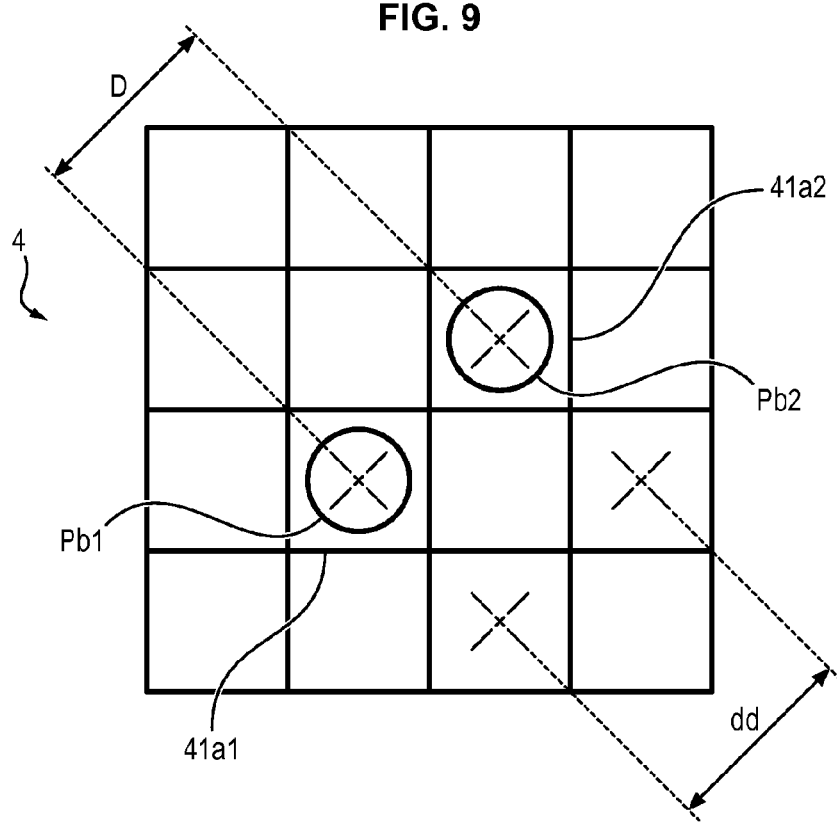

According to a second alternative embodiment, and with reference to FIG. 9, the plate 3 is adapted so that the first image Pb1 is shifted, in the plane of the sensitive surface 40 of the imaging sensor 4, by a distance D equal to a multiple of the spacing dd in the direction of a diagonal of elementary sensors 41 defined as the distance between the centers of two elementary sensors 41 positioned diagonally relatively to each other, with respect to the second image Pb2. With reference to FIG. 9 and for a targeted object of an angular dimension of less than the coverage of an elementary sensor 41, the imaging and detection system 1 produces two images Pb1 and Pb2 each corresponding to one of the two bands of wavelengths B1 and B2 on two adjacent elementary sensors 41a1 and 41a2, respectively. Each of these two elementary sensors 41a1 and 41a2, receives the radiation emitted by the targeted object only in one of the two bands of wavelengths B1 and B2. The processing block 7 analyzes the signals received by both of these elementary sensors 41a1 and 41a2 and measures the ratio of the intensities of the radiation from the targeted object in two bands of wavelengths B1 and B2. The processing block 7 analyses the time-dependent change of this ratio and triggers an alert in the case of detection of the differential spectral signature of the event to be detected and start up a process for tracking this target.

Figure 11:
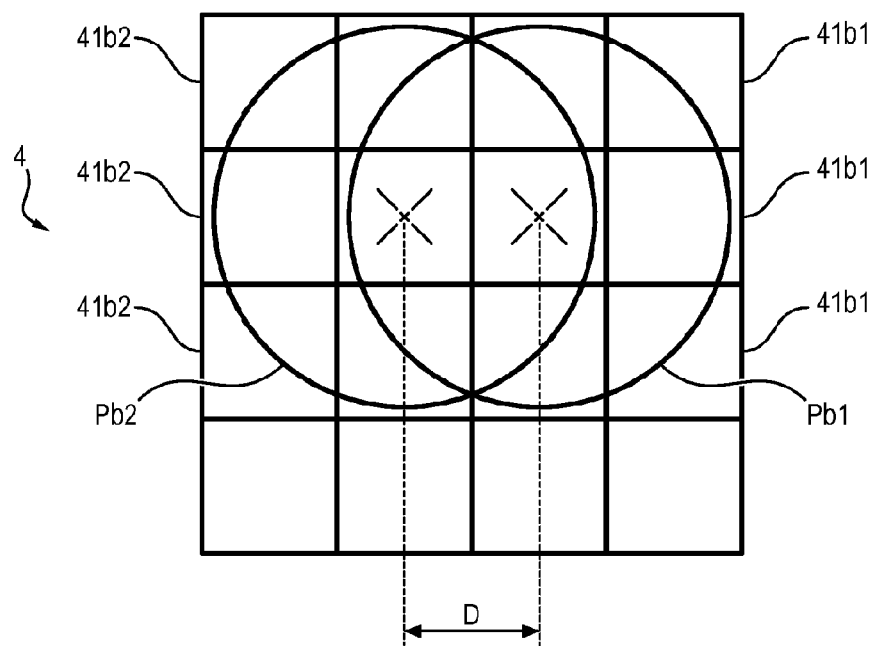

With reference to FIGS. 10 and 11, for a targeted object with an angular dimension A greater than the coverage of an elementary sensor 41, both images corresponding to two bands of wavelengths B1 and B2 formed on the sensitive surface 40 of the imaging sensor 4 overlap. The processing block 7 analyses the signals received by the elementary sensors positioned on the edge of both images, which are the only elementary sensors 41b1 and 41b2 for detecting the radiations emitted by combustion, only belonging to either one of the bands of wavelengths to be analysed, B1 and B2 respectively.

Figure 12:
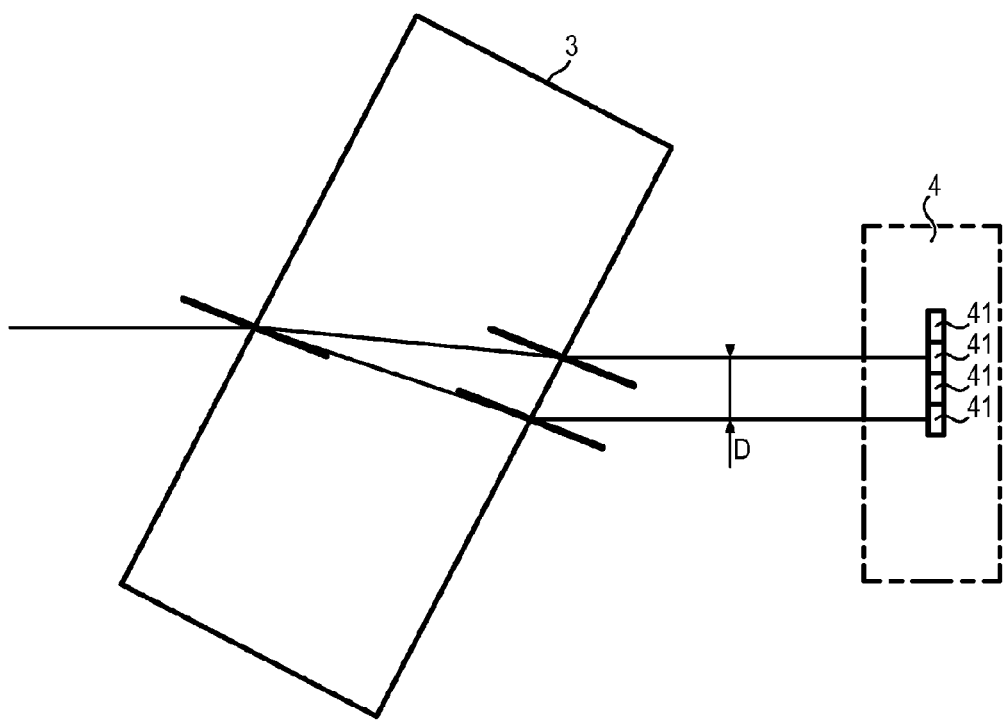
Figure 13:
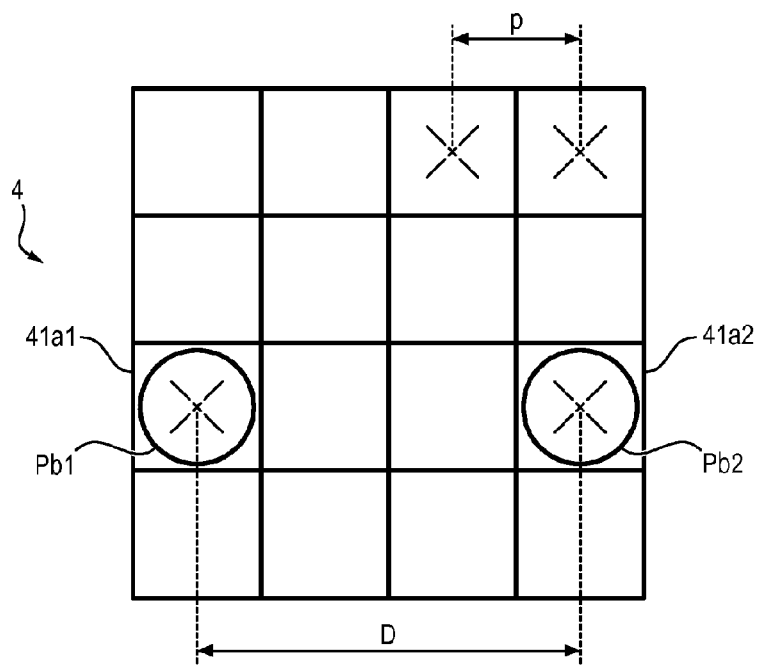

With reference to FIGS. 12 and 13, in order to facilitate the operation of the detection algorithms of the processing block 7, it may be useful to shift the image Pb1 of the first band of wavelengths B1 with respect to the image Pb2 of the second band of wavelengths B2 by more than one elementary sensor 41 and typically by three elementary sensors 41 so as to better detach the object to be detected from the local adjacent background. The image formed by the rays belonging to a first band of wavelengths B1 is shifted by a distance equal to the three times the spacing p between adjacent elementary sensors 41 with respect to the image formed by the rays belonging to the second band of wavelengths B2.

With reference to FIGS. 2 and 6, in order to remove the components of the signal corresponding to the background of the scene to be analyzed, the device is advantageously equipped with a band-pass filter 6 adapted so as to only let through the radiations with wavelengths comprised in both bands of wavelengths to be analyzed, B1 and B2. The band pass filter 6 may notably be deposited on the plate 3, but may also be integrated into the optics 2 or on the window 44. The band pass filter 6 may further be optimized so as to level or optimize the ratio between the intensities of the radiations in both bands of wavelengths B1 and B2 to be analyzed.

The material used for the detection matrix may for example be InSb, HgCdTe, PtSi, InGaAs, GaAs, PbS or PbSe, materials adapted to a use in both of these spectral bands and it may either be cooled or not depending on the application. The detection matrix 46 is for example of the QWIP multispectral type.

The optical plate with planar and parallel faces 3 is advantageously treated so as to be anti-reflective in order to avoid flux losses.

With reference to FIG. 14, the optical plate 3 may be placed in the cryogenic chamber 42 of the imaging sensor 4, this giving the possibility of avoiding variations of its optical characteristics depending on the temperatures of use.

With reference to FIG. 15, the window 44 of the cryogenic chamber 42 may consist of the plate 3, so as to minimize the number of optical components used.

The selection of the tilt angle $\alpha$ and of its orientation is advantageously adapted to the contemplated application, in order to give preference to top/bottom or right/left pieces of information or according to a 45° axis if the intention is to have homogenous information between both of these axes. For example in the case of a ground system seeking the direction (or azimuth) of the threat rather than its vertical position (or elevation), an angle $\alpha$ is selected so that the shift is horizontal.

With reference to FIGS. 3, 16, 17 and 18, the band pass filter 6 may advantageously equip the imaging sensor 4 as a spatially selective band-pass filter 5 consisting of an alternation of first elementary filters 51 letting through the wavelengths included in the first band of wavelengths B1 and of second elementary filters 52 letting through the wavelengths included in the second band of wavelengths B2, these filters being positioned on or in the vicinity of the surface of the imaging sensor 4 and aligned with the elementary sensors 41.

Figure 17:
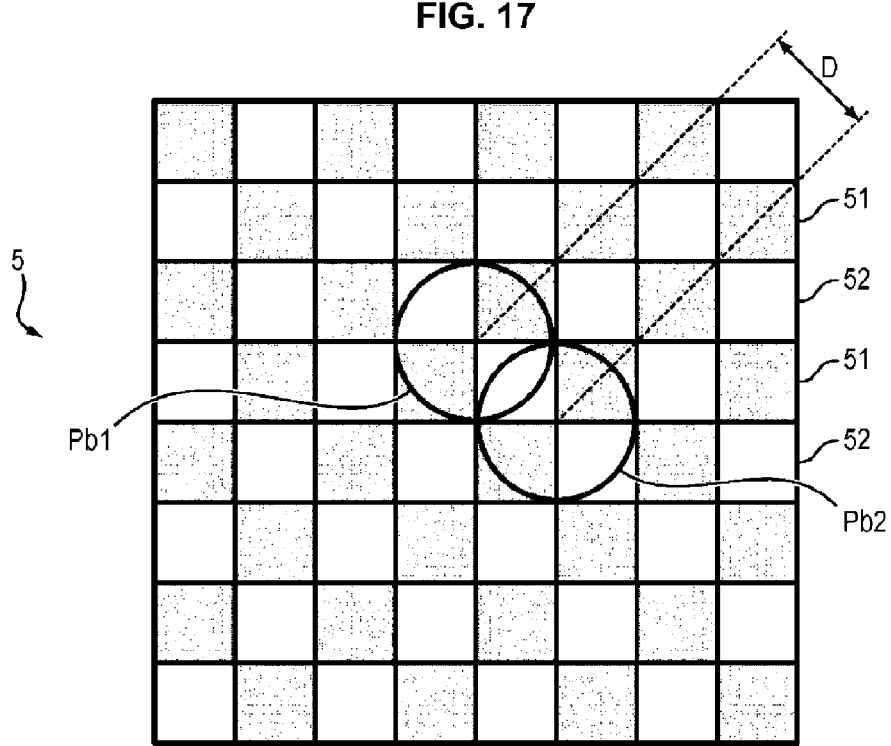

According to a first alternative embodiment and with reference to FIGS. 16 and 17, the first elementary filters 51 and the second elementary filters 52 are squares with a width equal to the spacing of the matrix of elementary sensors 41, if the latter are square, in the shift direction and positioned according to a checkerboard matrix distribution. In the case when the elementary sensors are not square, the dimension of the filters is adapted in both dimensions so as cover the elementary sensors. The optical definition or optical spot of the imaging optics 4 is advantageously selected so that the images Pb1 and Pb2 of a point-like source on the sensitive surface 40 of the imaging sensor 4 are of dimensions substantially equal to twice the spacing of the elementary sensors 41 of the matrix sensitive surface in the shift direction (see FIGS. 16, 17 and 18).

Figure 18:
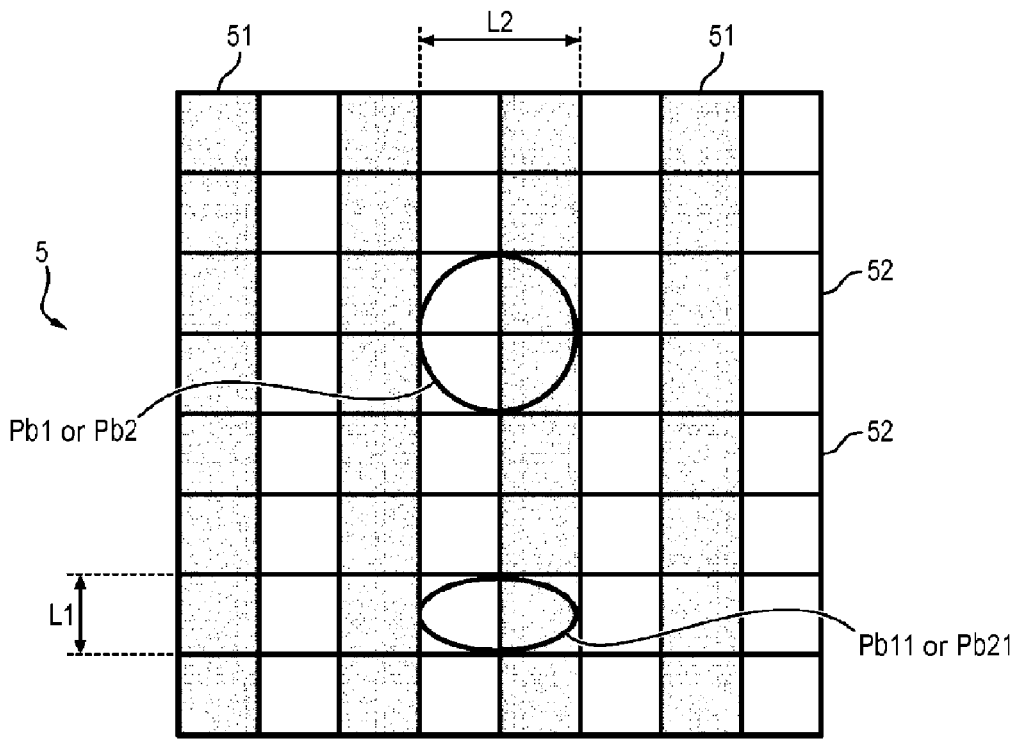

With reference to FIG. 18, alternatively, the optical definition or optical spot of the imaging optics 4 is advantageously selected so that the images Pb11 and Pb21 of a point-like source on the sensitive surface 40 of the imaging sensor 4 have a dimension L2 along the shift direction substantially equal to twice the spacing of the matrix of elementary sensors 41 in the shift direction and a dimension L1 along the direction perpendicular to the shift direction substantially equal to the spacing of the elementary sensors 41 in the direction perpendicular to the shift direction.

With reference to FIG. 16, and in order to avoid masking problems, the optical plate 3 is advantageously selected so that the shift D is greater than a set minimum value of the spacing between two elementary sensors 41. In this case, the signals should be compared on each block of four adjacent elementary sensors 41.

With reference to FIG. 17, the optical plate 3 is preferably selected so that the shift D is attached to the size of the diagonal of an elementary sensor 41 and oriented along one of the diagonals of the elementary sensors 41 so as to optimize the received flux for each elementary sensor 41.

According to a second alternative embodiment and with reference to FIG. 18, the first elementary filters 51 and the second elementary filters 52 are positioned in bands perpendicular to the shift direction D introduced by the plate 3 and with a width equal to the spacing of the matrix of elementary sensors 41 in the shift direction.

This alternative is particularly relevant in the case when only a piece of information along a direction is sought (for example azimuth information). In this configuration, the plate 3 is advantageously selected so that the shift D is oriented along this direction and the bands of elementary filters 51 and 52 along a perpendicular axis. The optical spot ("point spread function") of the imaging objective is advantageously selected so that the images Pb1 and Pb2 have a size substantially equal to twice the spacing of the matrix of elementary sensors 41 in the shift direction.

Unlike the other spectral shift systems, the imaging and detection system 1 proposed gives the possibility of retaining optical resolution (an optical spot) of the detection system equal to the size of an elementary detector of the sensor, since the plate 3 shifts the images sideways in both bands without substantially degrading the quality thereof. Further, unlike the other systems and notably the sensors with double spectral sensitivity by the use of elementary sensors with two types of sensitivity, or the systems with a local filter at the detector which degrade the optical resolution of the system, since it is necessary, in order to avoid any problem of masking of the target, to adapt the optical resolution of this system or optical spot (PSF or "point spread function") for covering two elementary sensors and thereby avoiding blind areas, the imaging and detection system 1 proposed retains optical resolution equal to the size of an elementary sensor for each of the analyzed spectral bands.

Further, this system in the case when the optical resolution—the optical spot—of the imaging system is equal to the size of an elementary sensor 41 and when objects with an image size equal to or less than that of the elementary sensors 41 are observed, gives the possibility of measuring, in both spectral bands B1 and B2 the emission intensities from the same targeted object, unlike the other systems where the neighboring elementary sensors do not see the same targeted object and therefore introduce bias as such.

Moreover, any system using a prism with convergent rays did not allow the same results to be obtained, since, in addition to an angular shift, which directly depends on the value of the refractive index of the material and not on its variation versus the wavelength like in the invention, a prism introduces a differential de-focusing between the extreme portions of the field and is also a generator of significant optical distortions, since it is used in a space where the rays are convergent towards the plane of the sensor. Further the value of the refractive index of the material used for these prisms, being highly sensitive to the variations of its temperature (a significant phenomenon for most infrared materials), these devices would apply stabilization of the temperature of the prism, in order to have homogenous angular deviation, regardless of the temperature of use of the system, which goes against the simplicity of these so-called systems.

The imaging and detection system 1 proposed is particularly adapted to the detection of radiating point-like targets, and may be used, inter alia, within the scope of detecting a pointer or laser designator, the only limitation coming from the sensitivity spectrum of the sensor used. The imaging and detection system 1 proposed was presented for a use in the infrared band II comprising the wavelengths comprised between 3.5 and 4.2 micrometers (band IIa) or comprised between 4.55 and 4.8 micrometers (band IIb), but it may also be used in other infrared spectral bands and notably the infrared band I comprising the wavelengths comprised typically between 1.8 and 2.8 micrometers, the infrared laser bands typically corresponding to the wavelengths of 1.064 micrometers and 1.54 micrometers, or to the near infrared band comprising the wavelengths typically comprised between 0.78 micrometers and 1.1 micrometers.

The following tables give the results obtained for a few configurations and materials for different spectral bands, as an illustrative and non-limiting example.

| Band I - Band IIb | | | |
|---|---|---|---|
| Material | Sapphire | MgO | MgF$_2$ |
| Thickness in mm | 3.55 | 4.8 | 7.8 |
| Angle α ° | 5 | 5 | 5 |
| Angle α in rad. | 0.087 | 0.087 | 0.087 |
| λ2 nm | 4675 | 4675 | 4675 |
| λ1 nm | 2249 | 2249 | 2249 |
| n(λ2) | 1.6406 | 1.6373 | 1.3390 |
| n(λ1) | 1.7323 | 1.7043 | 1.3660 |
| Shift in μm | 10.019 | 10.078 | 10.072 |

| Band I - Band IIa | | | |
|---|---|---|---|
| Material | Sapphire | MgO | MgF$_2$ |
| Thickness in mm | 3.2 | 4.95 | 6.9 |
| Angle α ° | 10 | 10 | 10 |
| Angle α in rad. | 0.175 | 0.175 | 0.175 |
| λ2 nm | 3850 | 3850 | 3850 |
| λ1 nm | 2249 | 2249 | 2249 |
| n(λ2) | 1.6806 | 1.6714 | 1.3507 |
| n(λ1) | 1.7323 | 1.7043 | 1.3660 |
| Shift in μm | 10.023 | 10.058 | 10.062 |

| 1.064 μm and Band I | | | | |
|---|---|---|---|---|
| Material | Sapphire | MgO | Silica | MgF$_2$ |
| Thickness in mm | 7.8 | 6.2 | 5.05 | 9.8 |
| Angle α ° | 10 | 15 | 15 | 15 |
| Angle α in rad. | 0.175 | 0.262 | 0.262 | 0.262 |
| λ2 nm | 2249 | 2249 | 2249 | 2249 |
| λ1 nm | 1064 | 1064 | 1064 | 1064 |
| n(λ2) | 1.7323 | 1.7043 | 1.4342 | 1.3660 |
| n(λ1) | 1.7545 | 1.7220 | 1.4496 | 1.3732 |
| Shift in μm | 10.046 | 10.026 | 10.056 | 10.038 |

| 1.54 μm and Band I | | | |
|---|---|---|---|
| Material | Sapphire | MgO | Silica |
| Thickness in mm | 8.2 | 10.1 | 7.8 |
| Angle α ° | 15 | 15 | 15 |
| Angle α in rad. | 0.262 | 0.262 | 0.262 |
| λ2 nm | 2249 | 2249 | 2249 |
| λ1 nm | 1540 | 1540 | 1540 |
| n(λ2) | 1.7323 | 1.7043 | 1.4342 |
| n(λ1) | 1.7462 | 1.7151 | 1.4441 |
| Shift in μm | 10.096 | 10.052 | 10.049 |

| 1.54 μm and Band IIb | | | |
|---|---|---|---|
| Material | Sapphire | MgO | MgF$_2$ |
| Thickness in mm | 3.12 | 4.15 | 6.8 |
| Angle α ° | 5 | 5 | 5 |
| Angle α in rad. | 0.087 | 0.087 | 0.087 |
| λ2 nm | 4675 | 4675 | 4675 |
| λ1 nm | 1540 | 1540 | 1540 |
| n(λ2) | 1.6406 | 1.6373 | 1.3390 |
| n(λ1) | 1.7464 | 1.7151 | 1.3699 |
| Shift in μm | 10.075 | 10.062 | 10.014 |

| 1.54 μm and Band IIa | | | |
|---|---|---|---|
| Material | Sapphire | MgO | MgF$_2$ |
| Thickness in mm | 3.4 | 5 | 7.4 |
| Angle α ° | 7.5 | 7.5 | 7.5 |
| Angle α in rad. | 0.131 | 0.131 | 0.131 |
| λ2 nm | 3850 | 3850 | 3850 |
| λ1 nm | 1540 | 1540 | 1540 |
| n(λ2) | 1.6806 | 1.6714 | 1.3507 |
| n(λ1) | 1.7462 | 1.7151 | 1.3699 |
| Shift in μm | 10.008 | 10.031 | 10.076 |

| Near IR and 1.064 μm | | | | |
|---|---|---|---|---|
| Material | Sapphire | MgO | Silica | MgF$_2$ |
| Thickness in mm | 22.8 | 17.1 | 23.6 | 37.5 |
| Angle α ° | 15 | 15 | 15 | 15 |
| Angle α in rad. | 0.262 | 0.262 | 0.262 | 0.262 |
| λ2 nm | 1064 | 1064 | 1064 | 1064 |
| λ1 nm | 820 | 820 | 820 | 820 |
| n(λ2) | 1.7545 | 1.7220 | 1.4496 | 1.3732 |
| n(λ1) | 1.7596 | 1.7285 | 1.4530 | 1.3751 |
| Shift in μm | 10.092 | 10.058 | 10.087 | 10.065 |

| Near IR and 1.54 μm | | | | |
|---|---|---|---|---|
| Material | Sapphire | MgO | Silica | MgF$_2$ |
| Thickness in mm | 8.7 | 8.28 | 8.9 | 13.6 |
| Angle α ° | 15 | 15 | 15 | 15 |
| Angle α in rad. | 0.262 | 0.262 | 0.262 | 0.262 |
| λ2 nm | 1540 | 1540 | 1540 | 1540 |
| λ1 nm | 820 | 820 | 820 | 820 |
| n(λ2) | 1.7464 | 1.7151 | 1.4441 | 1.3699 |
| n(λ1) | 1.7596 | 1.7285 | 1.4530 | 1.3751 |
| Shift in μm | 10.037 | 10.019 | 10.060 | 10.030 |

| Band I and Near IR | |
| --- | --- |
| Material | Silica |
| Thickness in mm | 4.15 |
| Angle α ° | 15 |
| Angle α in rad. | 0.262 |
| λ2 nm | 2249 |
| λ1 nm | 820 |
| n(λ2) | 1.4342 |
| n(λ1) | 1.4530 |
| Shift in μm | 10.037 |

The invention claimed is:

1. An infrared imaging and detection system by spectral analysis in several bands of wavelengths including:
    an imaging sensor including a plurality of elementary sensors forming together a matrix sensitive surface;
    an imaging optics being an optical focusing system, adapted for forming on the sensitive surface-of the imaging sensor, a first image (Pb1) of the scene to be analyzed in a first band of wavelengths (B1), and at least one second image (Pb2) of the scene to be analyzed in a second band of wavelengths (B2),
    an optical device adapted for shifting the first image (Pb1) relatively to the second image (Pb2) in the plane of the sensitive surface,
    wherein the optical device adapted for shifting the first image (Pb1) relatively to the second image (Pb2) in the plane of the sensitive surface includes a single fixed optical plate with parallel faces, the shift between the images being along a direction defined by a row, a column or a diagonal of elementary sensors, the shift distance being equal to the distance (p, dd) between two elementary sensors of the matrix sensitive surface along this direction or to a multiple of this distance, the single fixed optical plate with parallel faces being positioned between the imaging optics and the imaging sensor.

2. The imaging and detection system according to claim 1, wherein the fixed optical device is a plate with planar and parallel faces made in a chromatic material, said plate being fixed and tilted with respect to the plane of the sensitive surface of the imaging sensor.

3. The imaging and detection system according to claim 1, wherein the tilt angle (α) of said plate, the thickness (e) of the latter and its material, are adapted so that the shift distance is equal to the distance (p, dd) between two elementary sensors of the matrix sensitive surface along the shift direction or to a multiple of this spacing (p, dd).

4. The imaging and detection system according to claim 1, wherein the chromatic optical material of the plate, has a chromatic dispersion coefficient of more than 0.002 and preferably more than 0.005.

5. The imaging and detection system according to claim 1, wherein the plate is a material which is selected from the following materials: sapphire, calcium fluoride, barium fluoride, sodium fluoride, magnesium fluoride or magnesium oxide and silica.

6. The imaging and detection system according to claim 1, wherein it includes a band-pass filter adapted for optimizing the ratio of the intensities of the radiations in the first (B1) and the second (B2) band of wavelengths.

7. The imaging and detection system according to claim 1, wherein the imaging optics is adapted so that its optical resolution is of dimensions substantially equal to those of an elementary sensor of the sensitive matrix surface.

8. The imaging and detection system according to claim 1, wherein it includes a spatially selective pass-band filter consisting of an alternation of first elementary filters letting through the wavelengths comprised in the first band of wavelengths (B1) and of second elementary filters letting through the wavelengths comprised in the second band of wavelengths (B2) and positioned in the vicinity of the sensitive surface of the imaging sensor.

9. The imaging and detection system according to claim 8, wherein the first elementary filters and the second elementary filters of the spatially selective band-pass filter are positioned according to a checkerboard matrix distribution and are of a width equal to the distance (p, dd) between two elementary sensors in the shift direction.

10. The imaging and detection system according to claim 8, wherein the first elementary filters and the second elementary filters are positioned in bands perpendicular to the direction of the shift and are of a width equal to the distance (p, dd) between two elementary sensors in the shift direction.

11. The imaging and detection system according to claim 8 wherein the imaging optics is adapted so that its optical resolution is of a dimension substantially equal to twice the distance (p, dd) between two elementary sensors of the matrix sensitive surface in the shift direction.

12. The imaging and detection system according to claim 8 wherein the imaging optics is adapted so that its optical resolution has a dimension along the direction perpendicular to that of the shift substantially equal to the distance (p, dd) between two elementary sensors of the sensitive matrix surface.

13. The imaging and detection system according to claim 1, wherein the imaging sensor and the fixed optical device are placed in a cryogenic chamber.

14. The imaging and detection system according to claim 1, wherein the plate forms a window of a cryogenic chamber containing the imaging sensor.

15. The imaging and detection system according to claim 1, wherein both spectral bands (B1) and (B2) are selected from the following spectral bands:
    infrared bands IIa or IIb;
    infrared band I;
    one or two infrared laser bands;
    near infrared band.

* * * * *